(12) United States Patent
Arya et al.

(10) Patent No.: US 9,510,060 B1
(45) Date of Patent: Nov. 29, 2016

(54) REDUNDANT UNIVERSAL TRANSPORT PROCESSING SYSTEM

(71) Applicant: The DIRECTV Group, Inc., El Segundo, CA (US)

(72) Inventors: Vishal Arya, Manhattan Beach, CA (US); Daniel M. Miner, Redondo Beach, CA (US); Sunil A. Jethwani, Los Angeles, CA (US); An P. Vuong, Gardena, CA (US); Vaibhav Singh, Los Angeles, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 14/682,968

(22) Filed: Apr. 9, 2015

Related U.S. Application Data

(60) Provisional application No. 62/098,792, filed on Dec. 31, 2014.

(51) Int. Cl.
| | |
|---|---|
| *H04N 7/20* | (2006.01) |
| *H04N 21/61* | (2011.01) |
| *H04N 21/6405* | (2011.01) |
| *H04N 21/266* | (2011.01) |
| *H04N 21/236* | (2011.01) |
| *H04L 12/46* | (2006.01) |

(52) U.S. Cl.
CPC ...... *H04N 21/6193* (2013.01); *H04L 12/4641* (2013.01); *H04N 21/236* (2013.01); *H04N 21/266* (2013.01); *H04N 21/6405* (2013.01)

(58) Field of Classification Search
USPC .............................................. 725/63, 68, 105
See application file for complete search history.

(56) References Cited

U.S. PATENT DOCUMENTS

| | | | |
|---|---|---|---|
| 8,155,125 B1 * | 4/2012 | Borgione | H04L 12/4641 370/395.3 |
| 2010/0115561 A1 * | 5/2010 | Ribordy | H04H 20/51 725/71 |
| 2015/0200839 A1 * | 7/2015 | Huang | H04L 45/02 370/221 |

* cited by examiner

*Primary Examiner* — Nnenna Ekpo
(74) *Attorney, Agent, or Firm* — Gates & Cooper LLP

(57) ABSTRACT

A system, apparatus, and method provide the ability to process media content streams. A primary and backup multiplexer are each configured to receive and multiplex multiple video streams to output IP multicast streams with unique unicast addresses. A primary and backup uniform transport processing system (UTPS) join the IP multicast streams and output each stream using a unique multicast group. Multiple virtual local area networks (VLANs) separate the joins of the primary UTPS from the joins of the backup UTPS. Primary and backup modulators join the IP multicast streams output from the primary or backup UTPS and convert the joined stream to radio frequency for uplink to a broadcast distribution network.

18 Claims, 11 Drawing Sheets

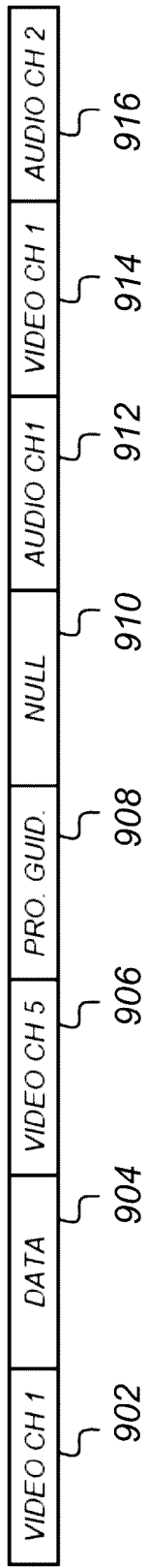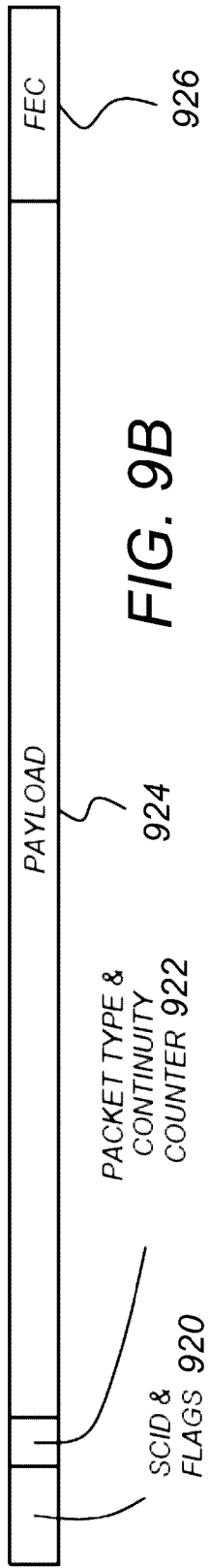

REDUNDANT UNIVERSAL TRANSPORT PROCESSING SYSTEM

BACKGROUND OF THE INVENTION

1. Technical Field

Embodiments of the invention relate generally to broadcast programming systems, and in particular, to a method, apparatus, and article of manufacture for utilizing virtual local area networks (VLANs) within a uniform transport processing system (UTPS) to uplink and stream digital programming to a satellite within a television broadcast system.

2. Description of the Related Art

In a broadcast delivery system, a key function is that of encoding/encrypting the content that is distributed to end users (i.e., enabling conditional access functionality). Accordingly, clear text content is received from various video sources and is encrypted prior to transmission/broadcast to end users (e.g., via satellite). In particular, in a satellite based system, such encryption is performed via an uplink signal processing system before the signals are transmitted/uplinked to a satellite. Prior art systems performed such encryption using a transport processing system (TPS). However prior art TPS systems often duplicated data/data streams and failed to provide efficient failover capabilities. In this regard, previously, the TPS output two redundant video stream streams. The first output stream is the primary output feed via physical interconnection (ASI—Asynchronous Serial Interface) to the RF (radio frequency) modulation system to uplink to the satellite. The secondary output stream is the same copy of the primary stream in terms of content but via using MPEG (Motion Picture Experts Group) over IP (internet protocol) multicast to a diverse uplink facility (DUF) over IP network. This dual outputs creates difficulties in support failover processing and maintaining software functionalities. To better understand these problems, a description of prior art TPS systems may be useful.

As used herein, the various components described may be utilized within a satellite broadcast television programming system (e.g., such as that offered by DirecTV™). In particular, the functionality may be performed by/within an uplink center. A detailed description of the overall satellite distribution system of embodiments of the invention is set forth below. FIG. 1 illustrates a layout of an uplink signal processing system 100 that utilizes a TPS of the prior art. Within a signal processing system 100, TPS systems provide a method where a remote compression system 102 outputs a standard Digital Video Broadcasting (DVB) compliant transport stream and performs required conversions/encryption.

Various local market offer their own local channels. Such local channels and/or other content are provided to the uplink signal processing system 100 a video sources 104. The video sources 104 are received in the uplink signal processing system 100 by a compression system 102. The compression system 102 includes various MPEG encoders 106 that encode/encrypt the video sources 104. The encrypted/encoded content from the MPEG encoders 106 are fed to both a primary multiplexer 108A and a backup multiplexer 108B. A conditional access system 110 (via an encryption interface) may further encrypt the signals to provide a transport stream that is compliant with a particular program provider (e.g., DirecTV™). The output of the multiplexers 108 is transponder specific (e.g., maps evenly to a transponder on a satellite). In this regard, each transponder may carry up to six (6) channels for high definition and/or more (e.g., eight [8]) for lower quality such as standard definition. Consequently, the multiplexer 108 output is a feed of channels that are mapped to a particular transponder.

A primary NPR 112A and backup NPR 112B provide NPR (noise-to-power ratio) functionality that may insert data services (e.g., program guide data 114, conditional access data 116, and interactive data 118) into the transport stream. Primary modulator 120A and backup modulator 120B modulate the flow of the transponder stream up the satellite. The stream that is selected (i.e., from either the primary modulator 120A or backup modulator 120B) is determined via modulator switch 122 which may be manually controlled by a user.

In view of the above, the primary responsibilities of a TPS are: translating a DVB complaint output of a compression system 102 to a satellite broadcast compliant transport stream; encrypting content for transport utilizing the same conditional access interface as an upstream conditional access server (e.g., a BCC—Broadcast Channel controller); and inserting data services utilizing existing noise to power ratio (NPR) functionality.

However, the above configuration fails to provide efficient failover capabilities, does not support new variations of conditional access configurations, does not enable the insertion of new/additional data services that are compliant with updated transport stream formats, fails to provide for slide insertion, fails to provide error reporting capability, and fails to provide video and audio monitoring.

SUMMARY OF THE INVENTION

Embodiments of the invention overcome the problems of the prior art by providing a uniform transport processing system (UTPS). The UTPS employs internet protocol (IP) as the transport mechanism thereby providing for an improved traffic flow chain utilized by the MUX (multiplexer) and modulators. The UTPS provides a new mechanism for delivering data to multiple video streams using IP multicast in a redundant active/standby configuration. Moreover, the UTPS and the configuration (that employs virtual local area networks [VLANs]) allows for a bundle of multicast video streams to be simultaneously transcoded and modulated on an active and standby capacity thus allowing for seamless failover (manual or automatic).

BRIEF DESCRIPTION OF THE DRAWINGS

Referring now to the drawings in which like reference numbers represent corresponding parts throughout:

FIG. 9A is a diagram of a representative data stream in accordance with one or more embodiments of the invention;

FIG. 9B is a diagram showing one embodiment of a data packet for one transport protocol that can be used with the present invention;

FIG. 9C is a diagram showing another embodiment of a data packet for the MPEG-2 protocol in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a uniform transport processing system that is internet protocol (IP) based to provide digital multicast transport streams within a satellite broadcast programming system.

Distribution System

Figure 2:
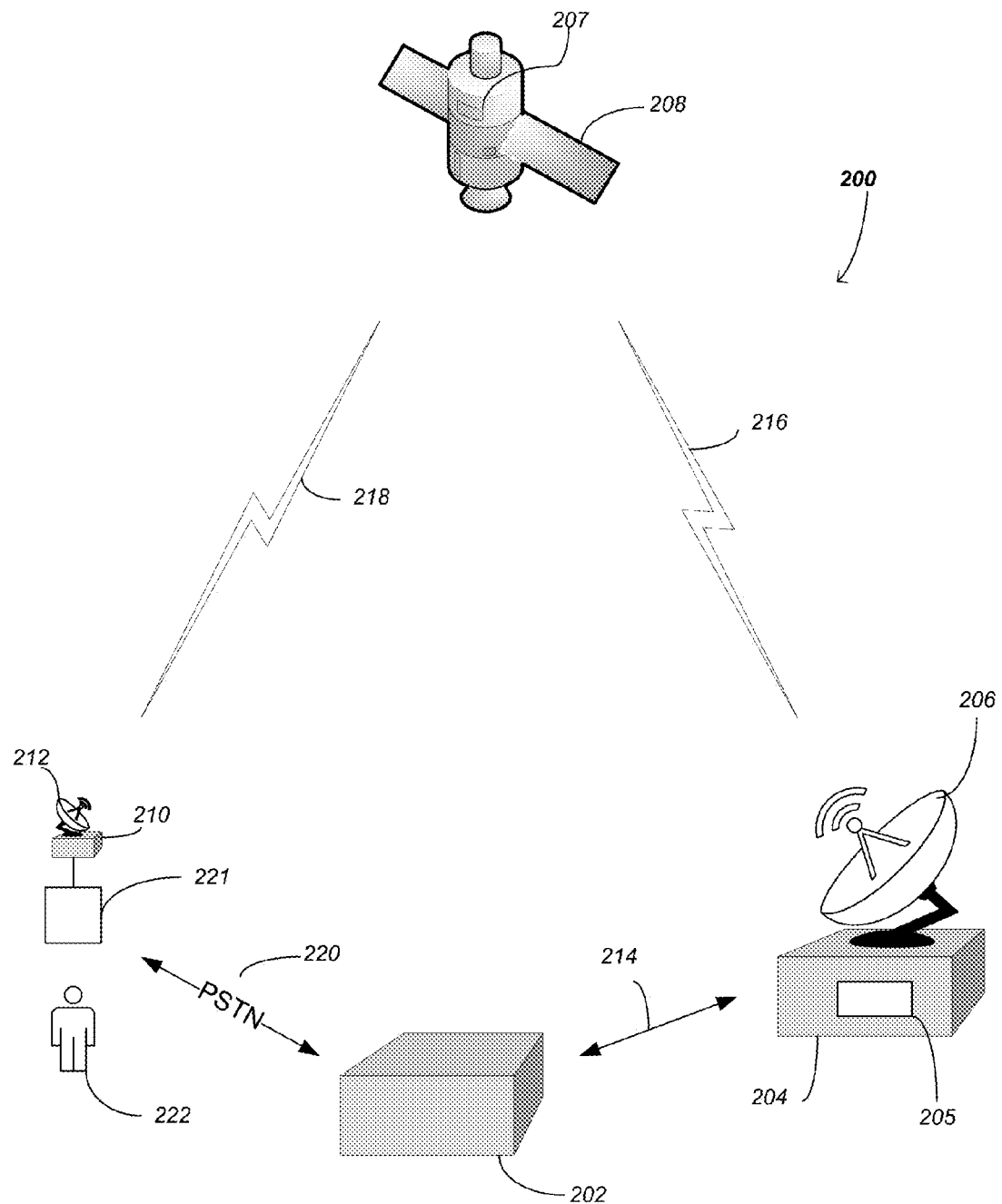
FIG. 2 is a diagram illustrating an overview of a distribution system that can be used to provide video data, software updates, and other data to subscribers in accordance with one or more embodiments of the invention.

FIG. 2 is a diagram illustrating an overview of a distribution system 200 that can be used to provide video data, software updates, and other data to subscribers. The distribution system 200 comprises a control center 202 in communication with an uplink center 204 (together hereafter alternatively referred to as a headend) via a ground or other link 214 and with a subscriber receiver station 210 via a public switched telephone network (PSTN) or other link 220. The control center 202, or headend provides program material (e.g. video programs, audio programs, software updates, and other data) to the uplink center 204 and coordinates with the subscriber receiver stations 210 to offer, for example, pay-per-view (PPV) program services, including billing and associated decryption of video programs.

The uplink center receives program material and program control information from the control center 202, and using an uplink antenna 206 and transmitter 205, transmits the program material and program control information to the satellite 208. The satellite 208 receives and processes this information, and transmits the video programs and control information to the subscriber receiver station 210 via downlink 218 using one or more transponders 207 or transmitters. The subscriber receiving station 210 comprises a receiver communicatively coupled to an outdoor unit (ODU) 212 and a display 221. The receiver processes the information received from the satellite 208 and provides the processed information to the display 221 for viewing by the subscriber 222. The ODU 212 may include a subscriber antenna and a low noise block converter (LNB).

In one embodiment, the subscriber receiving station antenna is an 18-inch slightly oval-shaped antenna. Standard definition transmissions are typically in the Ku-band, while the high definition (HD) transmissions are typically in the Ka band. The slight oval shape is due to the 22.5 degree offset feed of the LNB which is used to receive signals reflected from the subscriber antenna. The offset feed positions the LNB out of the way so it does not block any surface area of the antenna minimizing attenuation of the incoming microwave signal.

The distribution system 200 can comprise a plurality of satellites 208 in order to provide wider terrestrial coverage, to provide additional channels, or to provide additional bandwidth per channel. In one embodiment of the invention, each satellite comprises 16 transponders to receive and transmit program material and other control data from the uplink center 204 and provide it to the subscriber receiving stations 210. Using data compression and multiplexing techniques, two satellites 208 working together can receive and broadcast over 150 conventional (non-HDTV) audio and video channels via 32 transponders.

While the invention disclosed herein will be described with reference to a satellite based distribution system 200, embodiments of the invention may also be practiced with terrestrial-based transmission of program information, whether by broadcasting means, cable, or other means. Further, the different functions collectively allocated among the control center 202 and the uplink center 204 as described above can be reallocated as desired without departing from the intended scope of the present invention.

Although the foregoing has been described with respect to an embodiment in which the program material delivered to the subscriber 222 is video (and audio) program material such as a movie, the foregoing method can be used to deliver program material comprising purely audio information or other data as well. It is also used to deliver current receiver software and announcement schedules for the receiver to rendezvous to the appropriate downlink 218. Link 220 may be used to report the receiver's current software version.

Uplink Configuration

Overview

Figure 1:
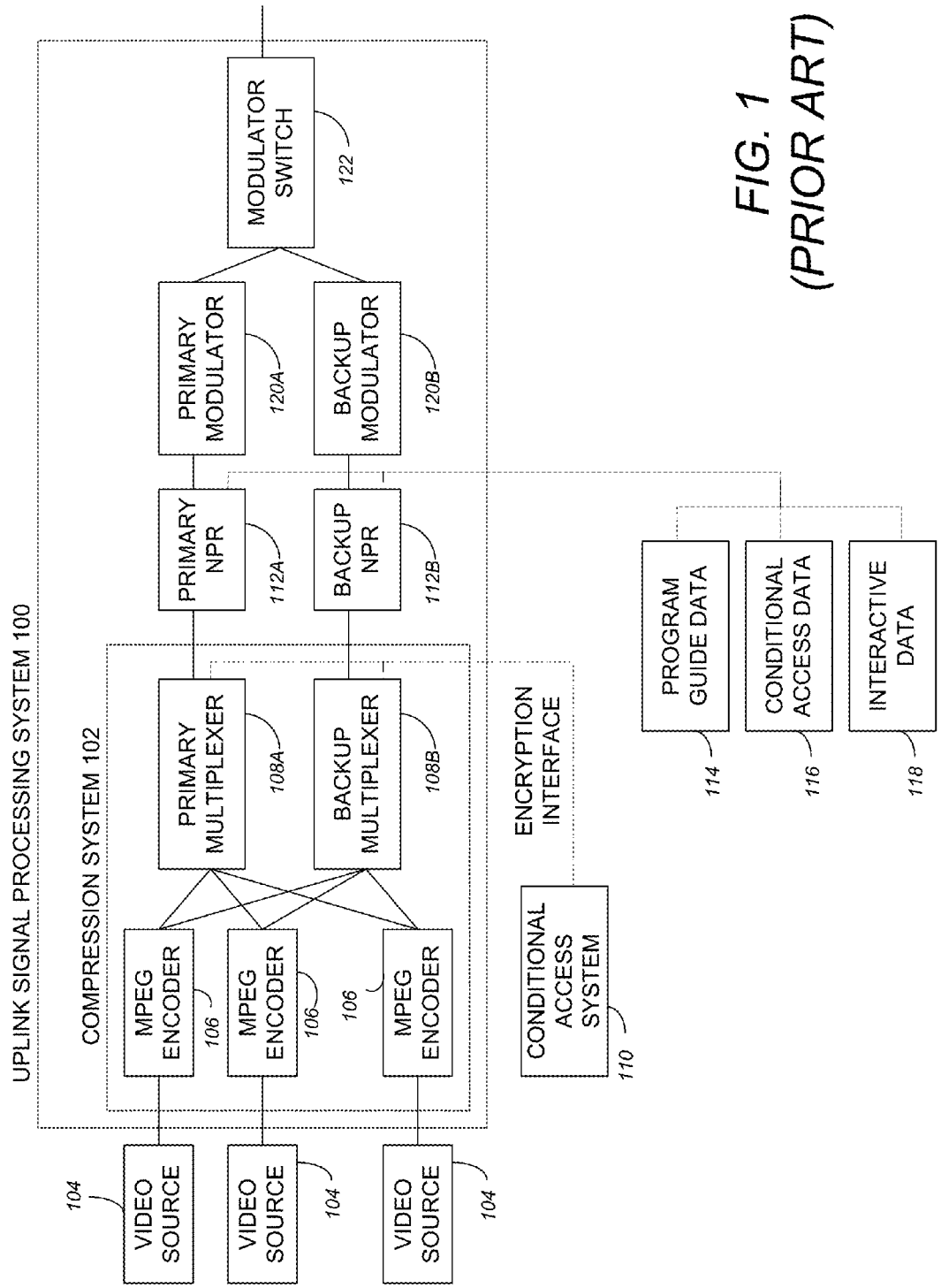
FIG. 1 illustrates a layout of an uplink signal processing system 100 that utilizes a transport processing system of the prior art.
Figure 3A:
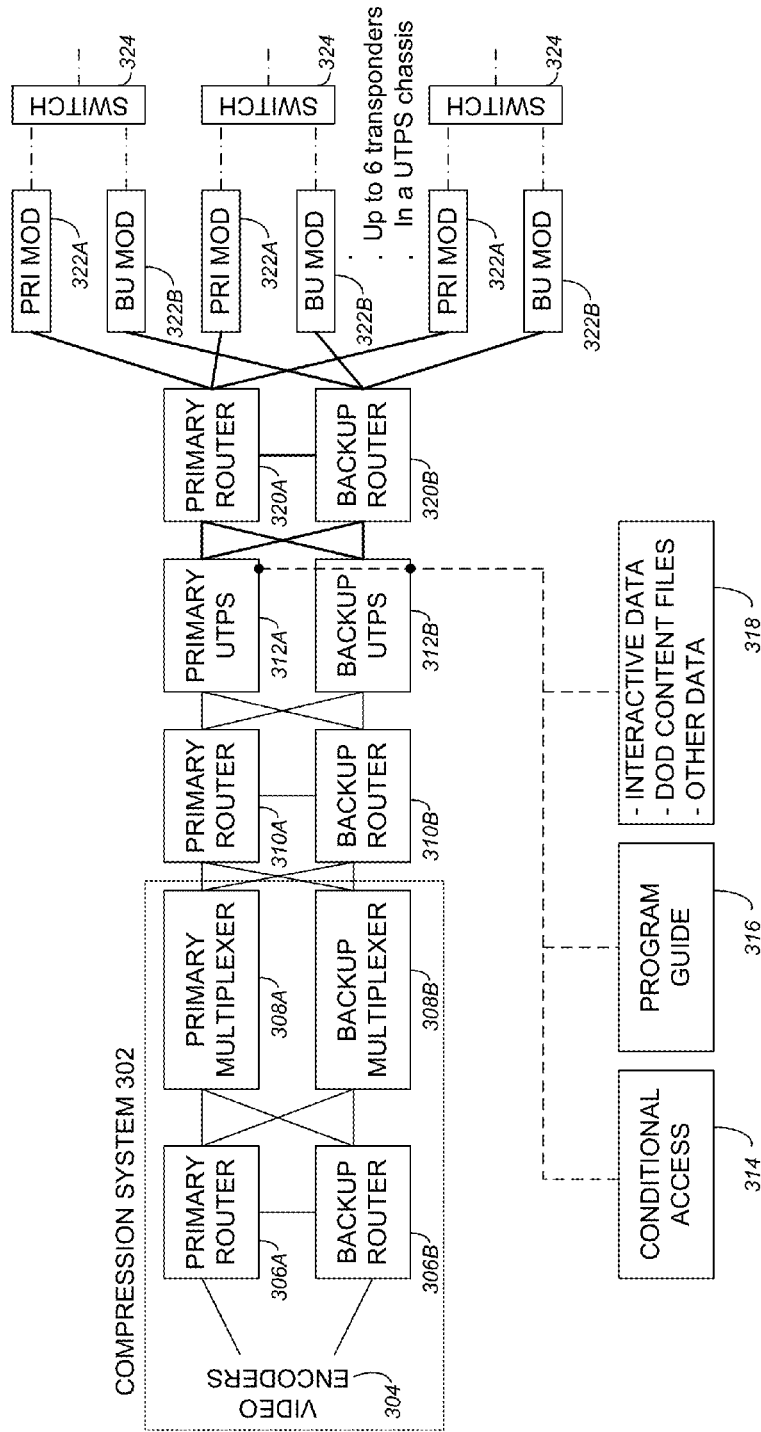
FIG. 3A illustrates the layout of an uplink signal processing system/configuration that utilizes the uniform transport processing system in accordance with one or more embodiments of the invention.

FIG. 1 illustrates an uplink configuration of the prior art as described above. FIG. 3A illustrates the layout of an uplink signal processing system/configuration that utilizes the uniform transport processing system in accordance with one or more embodiments of the invention.

Within compression system 302, video channels of information from video sources (which could be augmented respectively with one or more audio channels for high fidelity music, soundtrack information, or a secondary audio program for transmitting foreign languages, for example, audio source) and/or audio channels are provided to video encoders 304. Each of the encoders 304 may accept a presentation time stamp (PTS) from a controller. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 304 is a Motion Picture Experts Group (MPEG) encoder, but other decoders implementing other coding techniques can be used as well. A data channel may also be subjected to a similar compression scheme by an encoder, but such compression is usually either unnecessary, or performed by computer programs in the computer data source (for example, photographic data is typically compressed into *.TIF files or *.JPG files before transmission). After encoding by the encoders 304, the signals may be converted into data packets by a packetizer (not shown).

The data packets are assembled using a reference from a system clock (SCR), and from a conditional access manager, which provides the SCID to the packetizers for use in generating the data packets. The data packets are provided to primary router 306A and backup router 306B that route the data packets to the primary multiplexer 308A and the backup multiplexer 308B. The multiplexers 308A/308B multiplex the data packets into serial data that is routed via the primary router 310A and backup router 310B to the primary UTPS 312A and backup UTPS 312B. In this regard, the data within the compression system 302 and up to the primary UTPS 312A and backup UTPS 312B may in an unencrypted format with PSI/SI (program specific information/service information) (e.g., using MPEG/IP—[MPEG/Internet Protocol]).

The primary UTPS 312A and backup UTPS 312B utilize NPR functionality to insert conditional access information 314, program guide data 316, and interactive data/DOD (DirecTV™ On Demand—a video on demand service) content files/other data 318 into the transport stream. The data from each of these components 314-318 may be received by the UTPS 312 via Ethernet or a controlled network.

The primary UTPS 312A and backup UTPS 312B are configured as six (6) virtual instances for each UTPS 312 and are routed/mapped (via primary router 320A and backup router 320B) to primary modulators 322A and backup modulators 322B. The primary UTPS 312A may map to the primary modulators 322A while the backup UTPS 312B may map to the backup modulators 322B. Alternatively, primary modulators 322A may map to the backup UTPS 312B and the backup modulators 322B may map to the primary UTPS 312A. Such a capability to map the primary UTPS 312A to either the primary modulator 322A or backup modulator 322B (and the backup UTPS 312B to the primary modulators 322A or backup modulators 322B) enables failover capability. However, as used herein, each modulator 322 may only map to a single UTPS 312 (either the primary UTPS 312A or backup UTPS 312B). More particularly, each modulator 322 may only map to a single virtual instance of the UTPS 312 (as each UTPS may contain six virtual instances/virtual local area networks [VLANs]). The transport stream output from the UTPS 312 to the modulators 322 may be in MPEG/IP (encrypted with NPR data). In view of the above, each modulator 322 is configured with/part of its own VLAN.

Switches 324 are then used to determine whether the signal is transmitted from the primary modulator 322A or backup modulator 322B to the satellite 208 (via L-band).

With the configuration described above, the UTPS system 312 of embodiments of the invention is enabled to provide one or more of the following functionalities:

Transport encryption, utilizing a new variation of a conditional access interface updated to support A3 (new MPEG-2/DVB transport format and new AES [advanced encryption standard] encryption);
NPR functionality to insert data services 314-318 (updated to support new MPEG-2/DVB transport format);
Slide insertion (updated to support new MPEG-2/DVB transport format and MPEG-4 Part 10 video);
Error reporting; and
Video and audio monitoring.

In addition, the UTPS system 312 of embodiments of the invention may provide one or more of the following characteristics:

UTPS input and output uses an MPEG/IP interface via a customized PCIe (peripheral component interconnect express) card;
1 UTPS chassis supports up to 6 transponders (or 6 UTPS instances);
Operates in A3 or Legacy mode;
Runs on Red Hat Enterprise Linux™; and
GUI (graphical user interface) functionality accessible via a browser.

Embodiments of the invention are also directed towards the delivery technologies that enable the UTPS functionalities. In this regard, embodiments of the invention provide a new way of delivering data for multiple video streams using IP multicast. More specifically, embodiments of the invention provide a VLAN and multicast network design that provides data delivery for multiple video streams using IP multicast as the transport mechanism in a redundant active/standby configuration. Both the active and standby configurations of the flow are always active and receiving data to allow for active failover. This configuration separates the active and standby multicast streams using unique unicast IP addressing space while allowing for shared multicast addressing at different levels of the data flow.

Embodiments of the invention further allow for a bundle of multicast video streams to be simultaneously transcoded and modulated on an active and standby capacity thus allowing for seamless failover (manual or automatic). To enable the capabilities described herein, embodiments of the invention utilize a particular configuration for the IP addressing, redundancy protocols, and VLANs on the routers 306, 310, and 320 and the connected devices (e.g., the multiplexers 308, UTPS 312, and modulators 322).

Figure 3B:
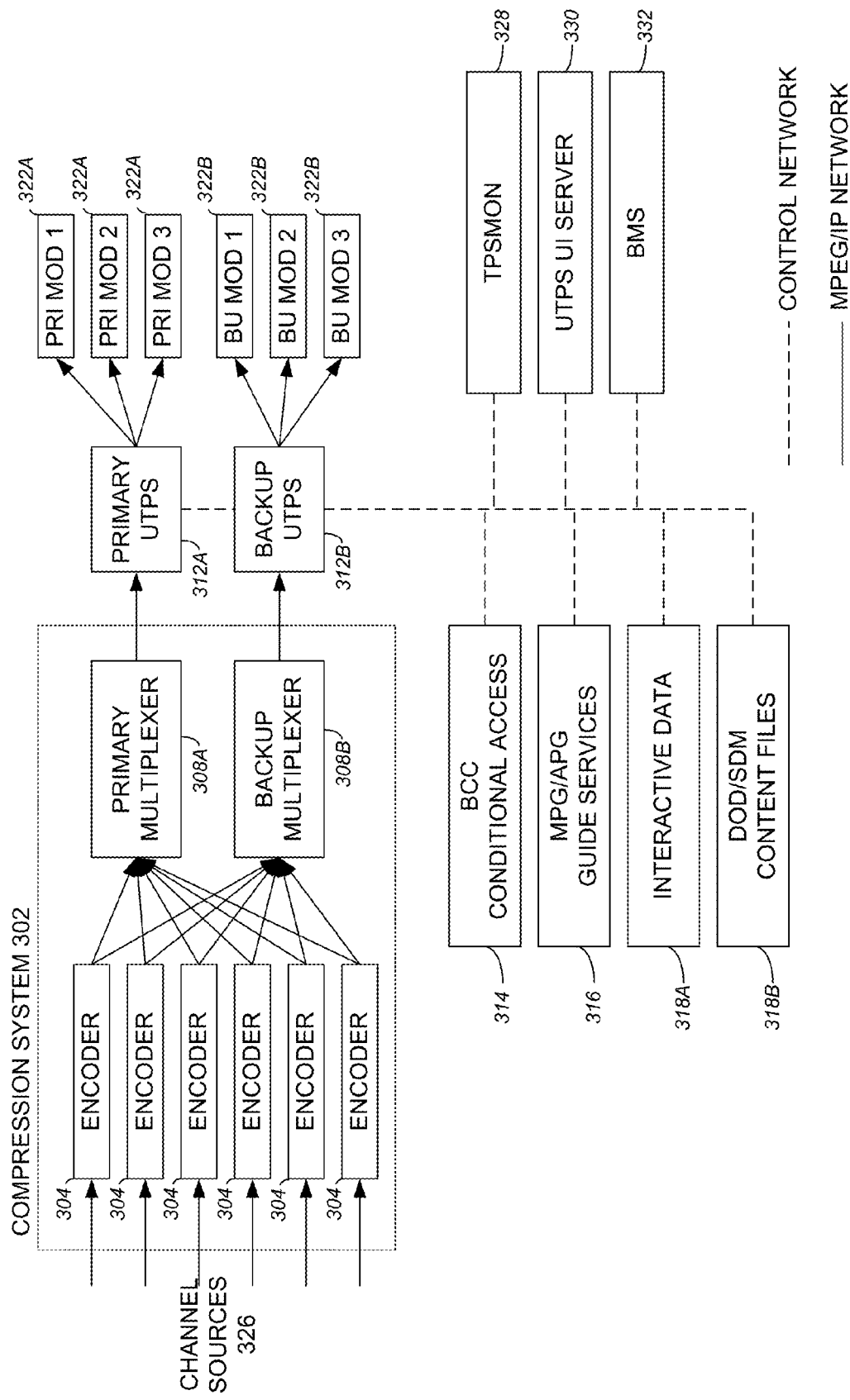
FIG. 3B illustrates a different perspective of the uplink signal processing system/configuration that utilizes the uniform transport processing system (UTPS) in accordance with one or more embodiments of the invention.

FIG. 3B illustrates a different perspective of the uplink signal processing system/configuration that utilizes the UTPS in accordance with one or more embodiments of the invention. In this regard, FIG. 3B illustrates a different perspective of the multicast data flow of FIG. 3A. The different channel sources 326 feed to the six (6) encoders 304. The encoders encode/encrypt the video sources 326 and output the encoded streams to the primary and backup multiplexers 308. The multiplexers 308 output the data to the primary and backup UTPS 312. Across a control network, UTPS 312 receive the BCC (Broadcast Control Center—a Cisco™/NDS™ encryption key generation system) conditional access data 314, the MPG/APG (Media Program Guide [a legacy guide system of DirecTV™]/Advanced Program Guide [current guide system of DirecTV™]) guide services data 316, interactive data 318A, DOD/SDM (Software Download Manager) content files 318B, TPSMON (TPS Monitoring System—an in house system that monitors the TPS performance and reliability) data 328, data from the UTPS user interface server 330, and BMS data 332. The UTPS 312 process such data to provide the transport stream to the primary and backup modulators 322.

Configuration

By utilizing an IP digital based system instead of the prior art methodologies, various additional technologies, protocols, and capabilities are enabled. Further, by utilizing an IP based system, a backup bank of modulators 322B may be placed anywhere in the country and easily used in case of failover. In this regard, video encoders 304 are commonly placed throughout the country. Remaining system components (e.g., multiplexers 308, routers 306/310/320, UTPS 312, and primary modulators 322A) are also often co-located with the video encoders 304 or at a single uplink center. Utilizing the IP based system of embodiments of the invention, an additional uplink center may be built at a different location that only requires the multiplexers 308 and UTPS 312. Such a single additional uplink center may be shared by all of the uplink centers across the country. Consequently, if a particular uplink center (e.g., in the NorthWest) were to fail or encounter problems, the modulators 322 located at another site could easily utilize the multiplexers 308 and UTPS 312 at the additional uplink center to provide the same signals.

Various protocols may be utilized/enabled in accordance with embodiments of the invention. For VLAN tagging, the 802.1q protocol may be utilized. Routers 306, 310, and 320 may utilize HSRP (host standby router protocol). IGMP (internet group management protocol) version 3, PIM sparse mode/SSM (protocol independent multicast/source specific multicast), and IP multicast may also be utilized.

The VLAN configuration provides for a single unique VLAN for all primary devices, and a single unique VLAN for all backup devices. The primary router 320A is also configured as an active HSRP device for the primary VLAN, and as a standby HSRP device for the backup VLAN. At the same time, the backup router 320B is configured as a standby HSRP device for the primary VLAN, and as an active HSRP device for the backup VLAN.

To support a protocol independent multicast (PIM) protocol, the primary router 320A is also configured as PIM primary using priority for the primary VLAN and as a PIM standby using priority for the backup VLAN. The backup router 320B is configured as a PIM standby using priority for the primary VLAN, and as a PIM primary using priority for the backup VLAN.

Configuring and designing the VLAN in this manner provides predictable traffic flow with failover while accomplishing the goal of data delivery without unnecessarily duplicating data. The traffic flow involves several pieces that are part of the UTPS solution as a whole. Described below is an overview of the individual pieces and how embodiments of the invention create a solution for the pieces to work together.

MUX (Multiplexer 308)

Primary and backup multiplexers (i.e., within compression system 302) may each output up to six (6) multicast streams each.

The primary MUX 308A outputs up to six (6) IP multicast streams with six (6) unique unicast addresses, each corresponding to a unique multicast address within the device.

The backup MUX 308B outputs up to six (6) copies of the primary IP multicast streams with six (6) unique unicast addresses, each corresponding to a unique multicast address within the device.

The multicast address for each stream is shared between the primary and backup MUX output. Table 1 illustrates sample addressing for a pair of MUX output:

TABLE 1

| Stream | Primary Unicast Address VLAN10 | Primary Multicast Address | Backup Unicast Address VLAN20 | Backup Multicast Address |
|---|---|---|---|---|
| 1 | 10.1.1.1/24 | 239.1.1.1 | 10.2.1.1/24 | 239.1.1.1 |
| 2 | 10.1.1.2/24 | 239.1.1.2 | 10.2.1.2/24 | 239.1.1.2 |

TABLE 1-continued

| Stream | Primary Unicast Address VLAN10 | Primary Multicast Address | Backup Unicast Address VLAN20 | Backup Multicast Address |
|---|---|---|---|---|
| 3 | 10.1.1.3/24 | 239.1.1.3 | 10.2.1.3/24 | 239.1.1.3 |
| 4 | 10.1.1.4/24 | 239.1.1.4 | 10.2.1.4/24 | 239.1.1.4 |
| 5 | 10.1.1.5/24 | 239.1.1.5 | 10.2.1.5/24 | 239.1.1.5 |
| 6 | 10.1.1.6/24 | 239.1.1.6 | 10.2.1.6/24 | 239.1.1.6 |

In computer networking, the multicast (one-to-many or many-to-many distribution) is a group communication where information is addressed to a group of destination computers simultaneously. In other words, a recipient that knows a multicast address can tune into or receive the stream transmitted to the multicast address. In contrast, unicast is a one-to-one connection between a client and a server. As illustrated in Table 1, the unicast address indicates the VLAN source (i.e., specifies which multiplexer 308A/308B) while the multicast address indicates the multicast stream address. In embodiments of the present invention, a recipient (e.g., the UTPS 312) may specify the source (i.e., the unicast address) as well as the group (i.e., the multicast address) to receive the desired transport stream. In this regard, the recipient specifies a group consisting of the source and group (S,G). Accordingly, the recipient specifies which MUX 308A/308B to listen to (i.e., by specifying a source and group pair). If the recipient merely specifies the group (e.g., and includes a wildcard for the source), both streams (i.e., from both the primary multiplexer 308A and backup multiplexer 308B) may be received.

In view of the above, the UTPS 312 can determine which host multiplexer 308 that it desires to receive the content stream from. The same content is streamed from both multiplexers 308A/308B to provide failover capabilities while the UTPS 312 can select the source and multicast address for the desired stream.

UTPS

The UTPS 312 consists of a pair of devices (primary UTPS 312A and backup UTPS 312B) used for transcoding, encryption and other functions. A primary UTPS unit 312A and a backup UTPS unit 312B ensure a redundant model. The primary UTPS 312A joins all primary streams output by the primary MUX 308A. The backup UTPS 312B joins all backup streams output by the backup MUX 308B.

The UTPS is configured with numerous VLANs and provides a solution to the inherent problem of redundant traffic. The VLAN scheme separates the igmp joins of the primary UTPS 312A from the igmp joins of the backup UTPS 312B. Separate trees are built for each device 312A/312B for each stream. With the VLAN separation, the functionality of the SSM joins is sustained and the UTPS 312 only receives the traffic it has requested to join. Unlike the MUX 308, the UTPS 312 has no requirements to share IP addressing and all unicast and multicast addressing is unique within the unit and between primary 312A and backup 312B units.

Once the input streams (i.e., from the MUX 308) have been processed, the UTPS 312 outputs each stream using a unique multicast group. Table 2 is an example of addressing on the UTPS:

TABLE 2

| Stream | Primary Unicast Address VLAN10 | Primary Multicast Address (Output) | Backup Unicast Address VLAN20 | Backup Multicast Address (Output) |
|---|---|---|---|---|
| 1 | 10.1.1.11/24 | 239.1.10.1 | 10.2.1.11/24 | 239.1.20.1 |
| 2 | 10.1.1.12/24 | 239.1.10.2 | 10.2.1.12/24 | 239.1.20.2 |
| 3 | 10.1.1.13/24 | 239.1.10.3 | 10.2.1.13/24 | 239.1.20.3 |
| 4 | 10.1.1.14/24 | 239.1.10.4 | 10.2.1.14/24 | 239.1.20.4 |
| 5 | 10.1.1.15/24 | 239.1.10.5 | 10.2.1.15/24 | 239.1.20.5 |
| 6 | 10.1.1.16/24 | 239.1.10.6 | 10.2.1.16/24 | 239.1.20.6 |

The primary UTPS 312A shares the VLAN (and subnet) with the primary MUX 308A output interfaces and the backup UTPS 312B shares the VLAN (and subnet) with the backup MUX 308B output interfaces. In view of the above, Table 1 provides the interaction between the MUX 308 and UTPS 312 on the input side of the UTPS 312 while Table 2 provides the output from the UTPS 312.

Modulator

The modulators 322 join encrypted feeds from the UTPS 312 and convert them to RF (radio frequency). Due to the fact that the input is IP multicast, the modulators 322 also require unique IP addressing. This addressing follows the model of the previous two devices (i.e., the multiplexer 308 and UTPS 312) in that the primary devices are in the primary VLAN (in the examples above, VLAN10) and backup devices are in the backup VLAN (in the examples above, VLAN20).

IP Address and VLAN Allocation

While SSM (source specific multicast) may be used by receivers to join multicast traffic, a problem may arise when multiple sources join the same multicast group. Embodiments of the invention overcome the issue of sharing multicast group addresses while delivering unique multicast streams to the intended receivers and maintaining a manageable address scheme.

To recreate the problem when multiple sources join the same multicast group, the following conditions must be present:

A multicast group address is being shared by two (2) or more devices; and

Two (2) or more receivers sharing a single VLAN join two (2) or more streams sharing the same multicast group.

When the above conditions occur, all receivers/recipients in a VLAN will receive all multicast streams sharing the multicast group in question. This poses several problems such as oversubscription of interface bandwidth due to unwanted multicast traffic, oversubscription of trunk links as the SSM functionality is now reduced to ASM (any-source multicast) and unwanted multicast trees will be built. This is also highly problematic with real-time video applications as they are highly sensitive to packet drops and unwanted or duplicate data.

The problems may be better understood with an example. The limitations of SSM multicast do not allow multiple sources to share a single multicast address while having one (1) or more receivers join each group without sending unwanted interfaces to all receivers in this scenario. For example:

Stream A=(S1,G1)—where S1 is a unique unicast address in VLANA

Stream B=(S2,G1)—where S2 is a unique unicast address in VLANB (can also be A)

Receiver 1=R1-R1 is a unicast address in VLANX

Receiver 2=R2-R2 is a unicast address in VLANX

Accordingly, stream A and stream B use S1 and S2 as sources which are on different VLANs (with the same multicast address—G1):

R1 submits SSM igmp join for StreamA

R2 submits SSM igmp join for StreamB

In other words, the first receiver, R1, sends a source specific multicast command to join stream A (i.e., instructs the router to listen to the multicast from source S1). The second receiver, R2, sends the same command for stream B.

With the above instructions, the expected/desired result is that R1 receives only Stream A and R2 only receives Stream B. However, as described above, SSM has a limitation that there cannot be more than one source for the same group. Thus the actual result is that R1 and R2 both receive stream A and stream B:

Expected: R1 receives only StreamA, R2 receives only StreamB;

Results: R1 receives both StreamA and StreamB. R2 also receives both StreamA and StreamB.

Embodiments of the invention overcome the limitations of SSM by separating the primary and backup chains into unique VLANs. Based on the IP address, a router 320 can determine if a source (e.g., multiplexer 308) belongs to a different VLAN. Each IP address has 32 bits with the first 24 bits (i.e., the first three octets) identifying the VLAN (as long as the IP address specifies "/24" as a suffix). Accordingly, referring to Tables 1 and 2, the primary unicast addresses all identify the same VLAN (10.1.1) while the backup unicast address is from a different VLAN (10.2.1).

Figure 4A:
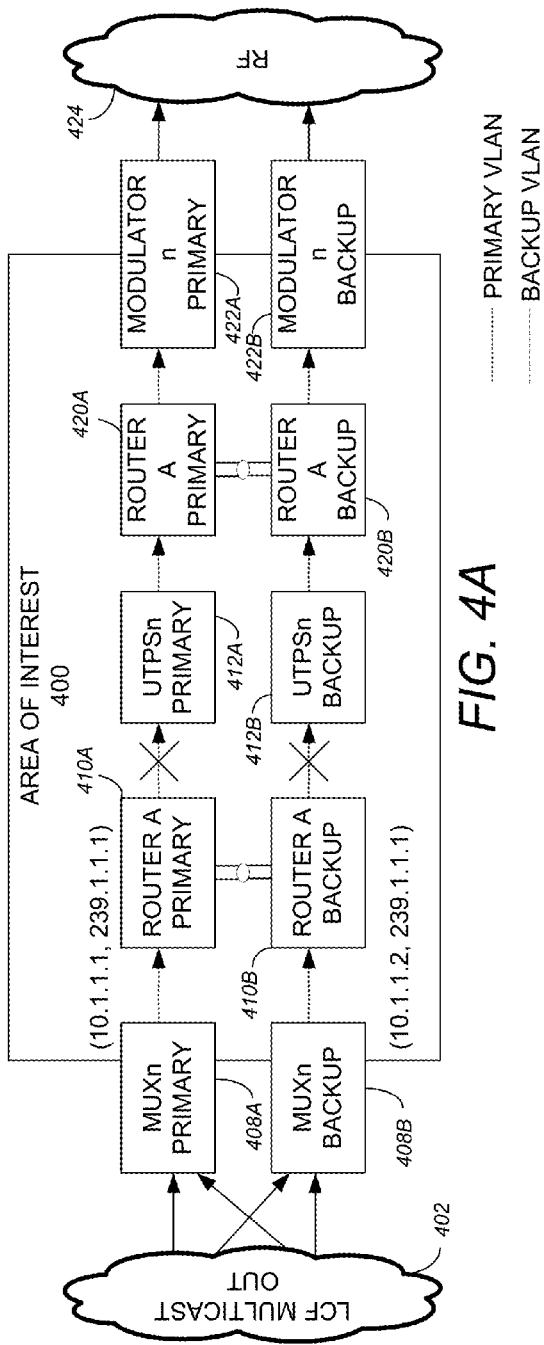
FIGS. 4A and 4B illustrate case examples of different virtual local area network (VLAN) configurations in accordance with one or more embodiments of the invention.
Figure 4B:
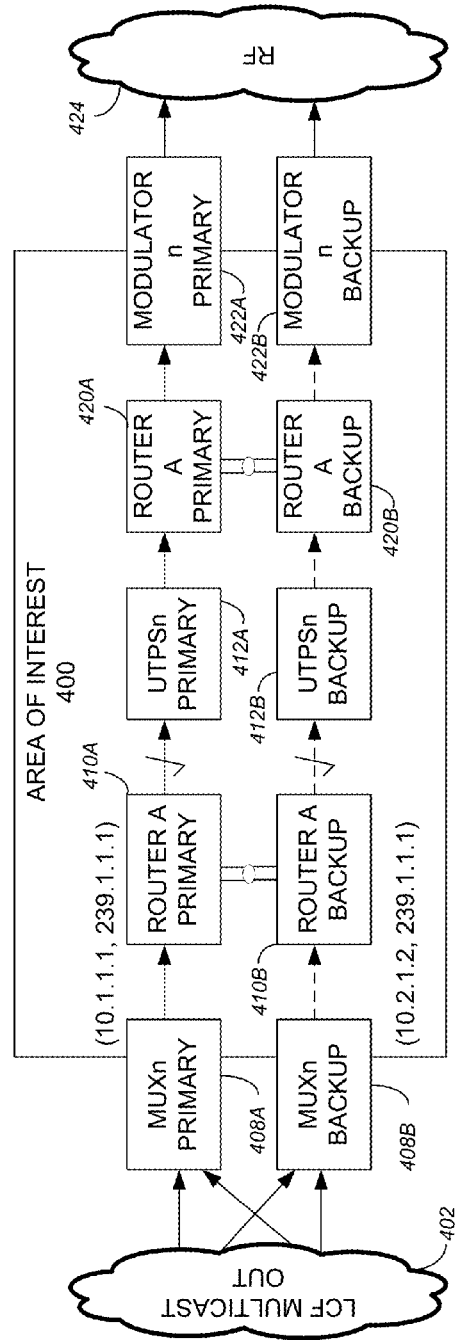

Case examples of different VLAN configurations are illustrated in FIGS. 4A and 4B. The area of interest 400 is the chain from the MUXs to the modulators. In FIG. 4A, all interfaces share a single VLAN. Multicasts are received on unwanted receivers and some packet loss is experienced. In particular, the LCF (limited core fix) multicast out signal 402 is received from the various encoders/video sources (e.g., encoders 304 and routers 306 of FIG. 3A). The remaining transmissions between the components 408-422 within the area of interest 400 are transmissions within the primary VLAN. Neither the primary router 410A or the backup router 410B is able to differentiate (S1,G1) from (S2,G1) within the same VLAN for SSM joins from the same VLAN. The routers 410 are unable to differentiate the sources since the first three octets (10.1.1) specify the same VLAN for both the primary MUXn 408A and the backup MUXn 408B (in addition to the SSM limitation wherein one cannot specify more than one source for the same group).

Consequently, both the UTPSn primary 412A and UTPSn backup 412B receive both primary (10.1.1.1, 239.1.1.1) and backup (10.1.1.2, 239.1.1.1) streams and suffers from packet loss due to receiving multiple copies of the same stream. The UTPS 412 transmits the streams via primary and backup routers 420A/420B to the primary and backup modulators 422A/422B that modulates the signal into RF 424.

In contrast to the case illustrated in FIG. 4A, in FIG. 4B, two different VLANs are utilized and are identified in the first three octets, one VLAN for the chain from MUXn primary 408A to the modulator n primary 422A (10.1.1) and a second VLAN for the chain from the MUXn backup 408B to the modulator n backup 422B (10.2.1). Due to the VLAN separation between the primary and backup streams, the routers 410 and 420 are able to deliver only wanted traffic (as indicated by the checkmarks between router 410 and UTPS 412). Accordingly, in the case B illustrated in FIG.

4B, embodiments of the invention provide for the use of multiple VLANs and all traffic flow is received as expected.

Figure 5:
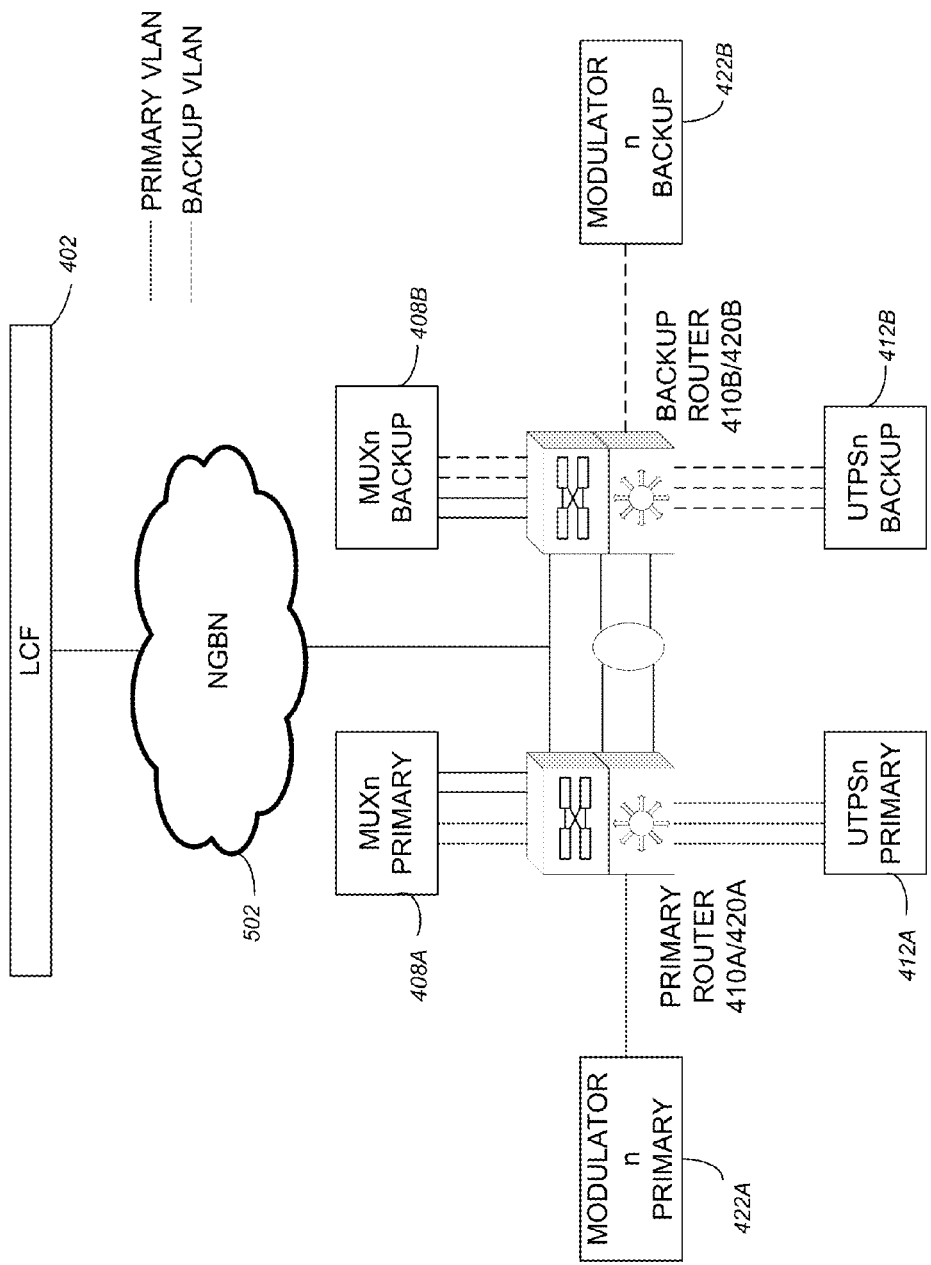
FIG. 5 illustrates a schematic of the physical connections between the various components at remote uplink facility (e.g., the IP output connectivity and VLANs) in accordance with one or more embodiments of the invention.

While FIG. 4 illustrates the logical connections between the various components 402-424, FIG. 5 illustrates a schematic of the physical connections between the various components at remote uplink facility (e.g., the IP output connectivity and VLANs) in accordance with one or more embodiments of the invention. The LCF 402 consists of the output signals that are transmitted to the next generation broadband network (NGBN) 502 (i.e., the satellite communication network that spans the continental United States and is responsible for carrying multicast feeds (from the LCF 402) between broadcast and regional centers.

The input from the LCF 402 is transmitted via the NGBN 502 through primary and backup routers 410/420 to the multiplexers 408, UTPS 412, and eventually to the modulators 422 (for modulation into RF).

Figure 6:
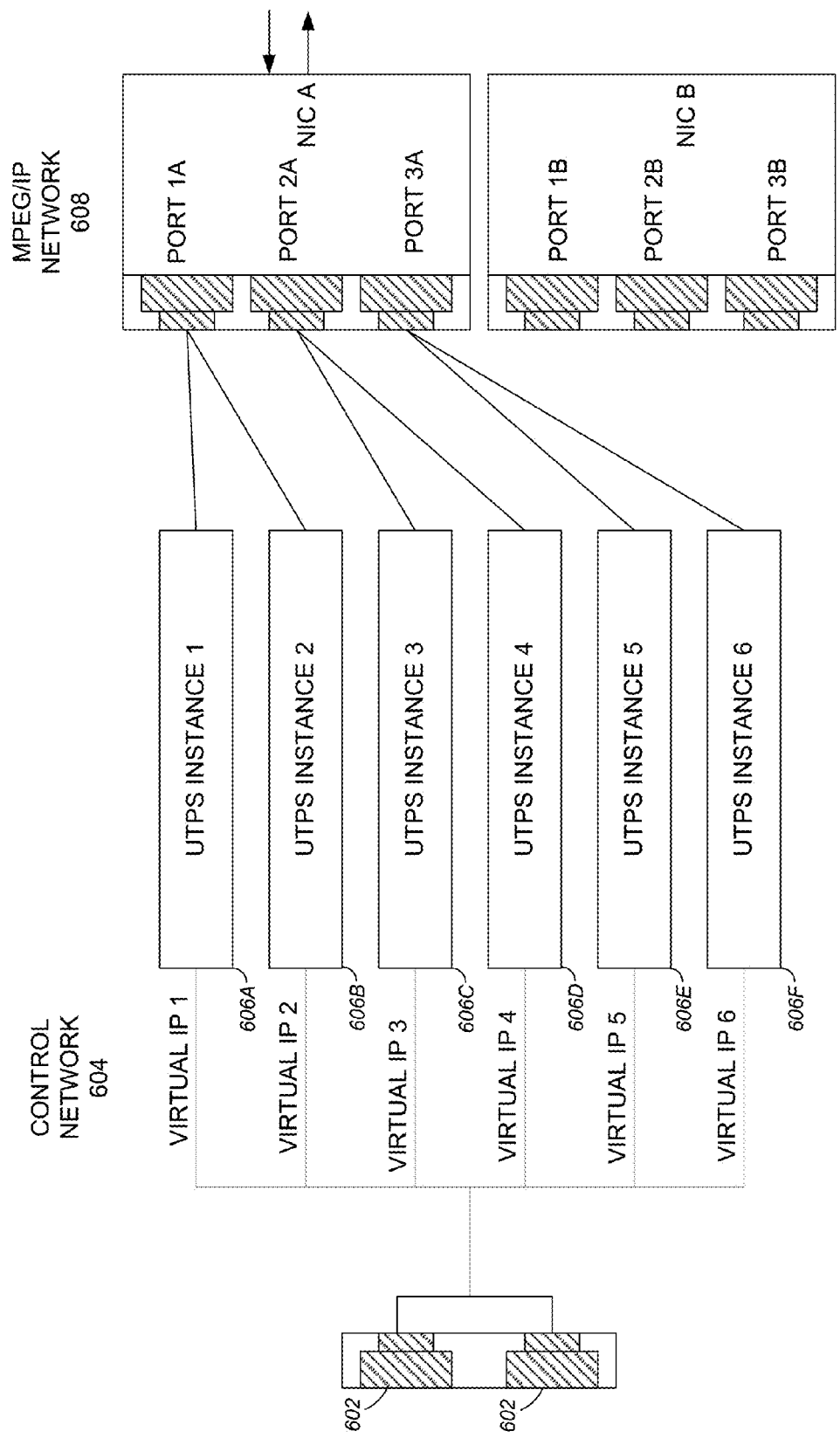
FIG. 6 illustrates a UTPS I/O in accordance with one or more embodiments of the invention.

FIG. 6 illustrates the UTPS 412 I/O in accordance with one or more embodiments of the invention. Two on-board NICs 602 (network interface controllers/cards) are bonded under one physical IP address. The NICs 602 provide a control network 604 by enabling six (6) VLANs (virtual IP 1-6) within a UTPS 606 (creating six [6] UTPS instances 606A-606F). The UTPS instances 606 output the multicast streams to an MPEG/IP Network 608. The input and output multicast streams are received on the same port for a UTPS instance. Each port of the MPEG/IP Network 608 communicates with two VLANs/UTPS instances 606. Ports 1A-3A provide the primary multicast while ports 1B-3B provide backup capabilities. Six (6) multiplexed multicasts may be received into NIC A on the MPEG/IP network 608. Similarly, six (6) output multicasts may be output from NIC A to a modulator (e.g., an uplink facility-UF) or DUF (diverse uplink facility/center) modulator. Likewise, similar input/output streams may be received to/from NIC B.

Logical Flow

Figure 7:
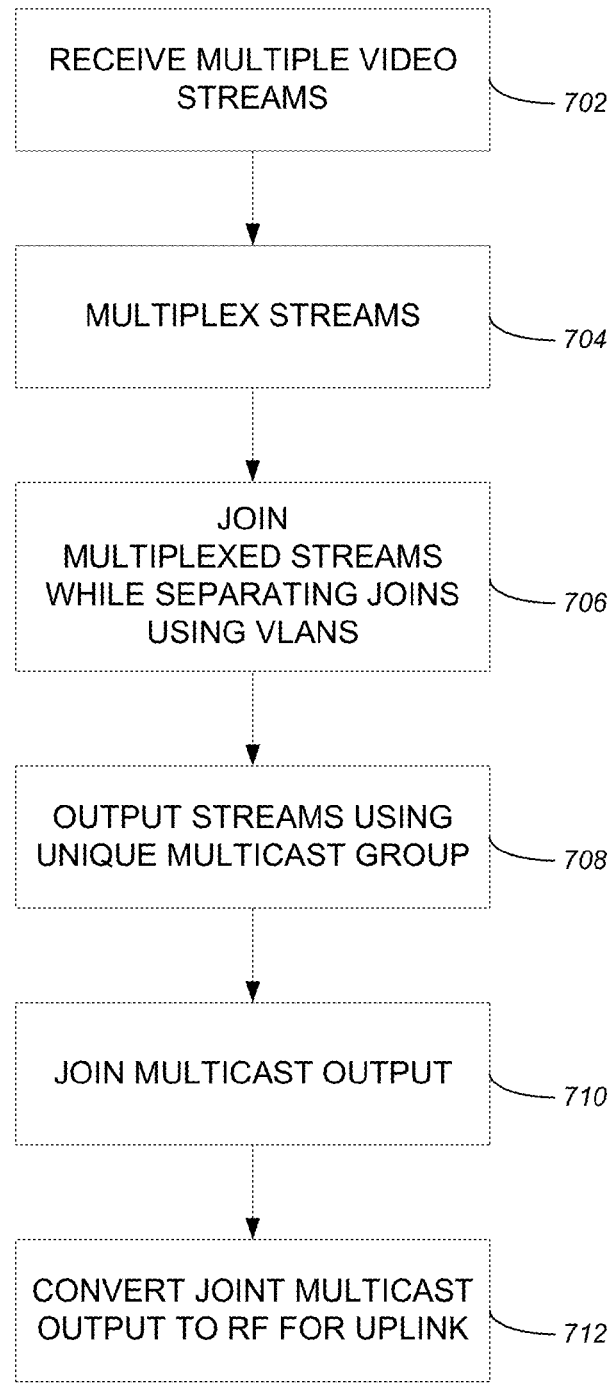
FIG. 7 illustrates the logical flow for processing media content streams in accordance with one or more embodiments of the invention.

FIG. 7 illustrates the logical flow for processing media content streams in accordance with one or more embodiments of the invention.

At step 702, multiple video streams (from one or more video sources) are received in a primary multiplexer and a backup multiplexer.

At step 704, the multiple video streams are multiplexed (by the primary and backup multiplexers) to output one or more internet protocol (IP) multicast streams with unique unicast addresses. Each IP multicast stream corresponds to a unique multicast address, and a subnet portion of the multicast address for each video stream is shared between the primary multiplexer and the backup multiplexer.

At step 706, a primary uniform transport processing system (UTPS) and a backup UTPS each join the one or more IP multicast streams output from either the primary multiplexer or the backup multiplexer. The joins (of the primary UPTS and the backup UTPS) are separated using multiple virtual local area networks (VLANs). The primary and backup UTPS may each support up to six (6) transponders, provide noise-to-power ratio (NPR) functionality by inserting data services into the one or more IP multicast streams, and provide transport encryption by encrypting the one or more IP multicast streams. Further, the input and output of the UTPSs may utilize a motion pictures expert group/internet protocol (MPEG/IP) interface via a customized peripheral component interconnect express (PCIe) card.

To provide the VLAN configuration, primary and backup routers may be configured. The primary router may serve as a first active hot standby router protocol (HSRP) device for one of the multiple VLANs that serves as a primary VLAN for the primary UTPS, and as a first standby HSRP device for one of the multiple VLANs that serves as a backup VLAN for the backup UTPS. Similarly, the backup router may serve as a second standby HSRP device for the primary VLAN, and as a second active HSRP device for the backup VLAN. At the same time, the primary router may serve as a first protocol independent multicast (PIM) primary router using priority for the primary VLAN, and as a first PIM standby router using priority for the backup VLAN. Likewise, the backup router may also serve as a second protocol independent multicast (PIM) primary router using priority for the backup VLAN, and as a second PIM standby router using priority for the primary VLAN.

At step 708, the primary and backup UTPS each output each of the one or more IP multicast streams using a unique multicast group.

At step 710, one or more primary modulators and one or more backup modulators each join one of the one or more IP multicast streams output from the primary UTPS or backup UTPS.

At step 712, the primary and backup modulators convert the joined IP multicast stream to radio frequency for uplink to a broadcast distribution network.

Program Guide Subsystem

Figure 8:
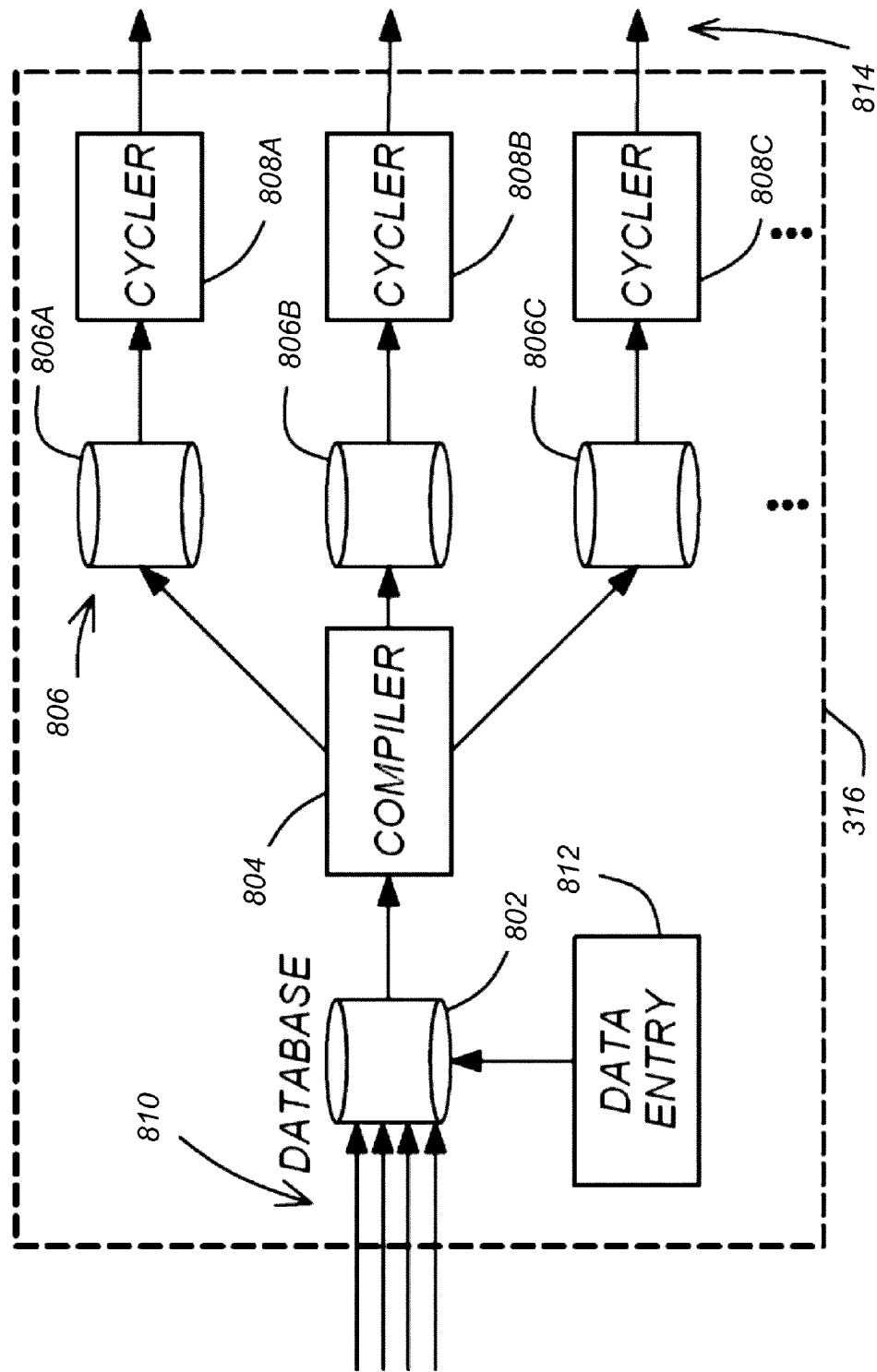
FIG. 8 is a block diagram of one embodiment of a program guide services/subsystem in accordance with one or more embodiments of the invention.

FIG. 8 is a block diagram of one embodiment of the program guide services/subsystem 316. The program guide data transmitting system 316 includes program guide database 802, compiler 804, sub-databases 806A-806C (collectively referred to as sub-databases 806) and cyclers 808A-808C (collectively referred to as cyclers 808).

Schedule feeds 810 provide electronic schedule information about the timing and content of various television channels, such as that found in television schedules contained in newspapers and television guides. Schedule feeds 810 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 802. These companies provide television schedule data for all of the television stations across the nation plus the nationwide channels, such as SHOWTIME, HBO, and the DISNEY CHANNEL. The specific format of the data that are provided by these companies varies from company to company. Program guide database 802 preferably includes schedule data for television channels across the entire nation including all nationwide channels and local channels, regardless of whether the channels are transmitted by the transmission station.

Program guide database 802 is a computer-based system that receives data from schedule feeds 810 and organizes the data into a standard format. Compiler 804 reads the standard form data out of program guide database 802, identifies common schedule portions, converts the program guide data into the proper format for transmission to users (specifically, the program guide data are converted into objects as discussed below) and outputs the program guide data to one or more of sub-databases 808.

Program guide data are also manually entered into program guide database 802 through data entry station 812. Data entry station 812 allows an operator to enter additional scheduling information, as well as combining and organizing data supplied by the scheduling companies. As with the computer organized data, the manually entered data are converted by the compiler into separate objects and sent to one or more of sub-databases 806.

The program guide objects are temporarily stored in sub-databases 806 until cyclers 808 request the information. Each of cyclers 808 preferably transmits objects at a different rate than the other cyclers 808. For example, cycler 808A may transmit objects every second, while cyclers 808B and 808C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 808 with a high rate of transmission, while program guide objects for later programs are sent to cyclers 808 with a lower rate of transmission. One or more of the data outputs 814 of cyclers 808 are forwarded to the packetizer of a particular transponder.

It is noted that the uplink configuration depicted in the prior figures and the program guide subsystem depicted in FIG. 8 can be implemented by one or more hardware modules, one or more software modules defining instructions performed by a processor, or a combination of both.

Format of Transmitted Program Guide Data

Prior to transmitting program guide data to sub-databases 806, compiler 804 organizes the program guide data from program guide database 802 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 804 into multiple frames. Each frame is made up of a plurality of 126 byte packets with each such packet marked with a service channel identification (SCID) number. The SCIDs are later used by receiver or set top box to identify the packets that correspond to each television channel. Each frame includes a frame header, program guide data and a checksum. Each frame header includes the same information as the object header described above—object type, object ID and version number. The frame header uniquely identifies the frame, and its position within a group of frames that make up an object. The program guide data within frames are used by a set top box to construct and display a program guide and other information on a user's television. The checksum is examined by a set top box to verify the accuracy of the data within received frames.

The following is a list of preferred object types, although many additional or different object types may be used: boot object, data announcement object, update list object, channel object, schedule object, program object, time object, deletion object, and a reserved object.

A boot object (BO) identifies the SCIDs where all other objects can be found. A BO is always transmitted on the same channel, which means that each packet of data that makes up a BO is marked with the same SCID number. BOs are transmitted frequently to ensure that set top boxes which have been shut off, and are then turned back on, immediately receive information indicating the location of the various program guide objects. Thus, BOs are sent from compiler 804 to a cycler 808 with a high rate of transmission.

A data announcement object (DAO) is an object that includes data that is to be announced to some or all of the set top boxes. The DAO can be used in the system described below to indicate that there is updated software to be installed in the set top box.

An update list object (ULO) contains a list of all the channel objects (COs), which are discussed below) in a network. A network is a grouping of all channels from a common source, such as all Digital Satellite System (DSAT) channels. For each channel object in the list of channel objects, the channel list object includes a channel object ID for that channel object. Each channel object is uniquely identified by its channel object ID.

Each channel object provides information about a particular channel. Each channel object points to a schedule object (discussed further below). Each channel object includes multiple fields or descriptors that provide information about that channel. Each descriptor includes a descriptor type ID that indicates the type of the descriptor. Descriptor types include "about" descriptors, "category" descriptors, and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A program object (PO) provides a complete description of a program. The program object is pointed to by other objects (namely, schedule objects, and HTML objects) that contain the starting time and duration of the program. Like channel objects, descriptors are used within program objects. Program objects use the same types of descriptors as channel objects. Category descriptors provide a category classification for a program and "about" descriptors provide a description of the program. If compiler 804 determines that a particular program is scheduled to appear on multiple channels, the program object for that program is transmitted a single time for the multiple channels, although, as discussed above, it may be retransmitted multiple times.

A schedule object (SO) points to a group of program objects. A schedule object is assigned a time duration by a schedule object (discussed below). Each schedule object identifies all of the program objects that must be acquired for the assigned time duration. Each schedule object is uniquely identified by a schedule object ID. A unique schedule object may be pointed to by more than one schedule object. As time progresses and the scheduling information becomes stale, the schedule object is no longer needed. Schedule objects that are not referenced by any schedule object are discarded by the set top box.

A schedule object (SO) contains the start time of the entire schedule, as well as the start time and duration of the general program objects. A schedule object points to program objects. The start time of each schedule object is given by its start time. As time progresses and the scheduling information becomes stale, a new schedule object replaces the previous version, and updates the scheduling information. Thus, the channel object of the schedule object need not be updated. Only the schedule object is updated.

A time object (TO) provides the current time of day and date at a transmission station. Time objects include format codes that indicate which part of the date and time is to be displayed. For example, the only part of the date of interest might be the year. Similarly, whenever dates and times are transmitted within an object, the dates and times are accompanied by format codes. The format codes instruct the set top box which portion of the transmitted date and time to display.

A deletion object (DO) provides a list of object IDs that the set top box must discard.

Reserved objects are saved for future improvements to the program guide system. When a new type of object is defined, all objects of that new type will include an object header with a reserved object type.

Broadcast Data Stream Format and Protocol

FIG. 9A is a diagram of a representative data stream. The first packet segment 902 comprises information from video channel 1 (data coming from, for example, the video sources 104/channel sources 326). The next packet segment 904 comprises computer data information that was obtained, for example from a computer data source. The next packet segment 906 comprises information from video channel 5 (from one of the video program sources 104/channel sources 326). The next packet segment 908 comprises program guide information such as the information provided by the program guide subsystem 316. As shown in FIG. 9A, null packets 910 created by a null packet module may be inserted into the data stream as desired.

The data stream therefore comprises a series of packets from any one of the data sources in an order determined by a controller. The data stream is encrypted by an encryption module, multiplexed by multiplexers 308, processed by the UTPS 312, modulated by the modulators 322 (typically using a QPSK modulation scheme), and provided to a transmitter, that broadcasts the modulated data stream on a frequency bandwidth to the satellite via the antenna 206. The receiver 210 receives these signals, and using the SCID, reassembles the packets to regenerate the program material for each of the channels.

FIG. 9B is a diagram showing one embodiment of a data packet for one transport protocol that can be used with embodiments of the present invention. Each data packet (e.g. 902-916) is 147 bytes long, and comprises a number of packet segments. The first packet segment 920 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 922 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 924 comprises 127 bytes of payload data, which is a portion of the video program provided by the video sources 104/channel sources 326 or other audio or data sources. The final packet segment 926 is data required to perform forward error correction.

Embodiments of the present invention may also be implemented using MPEG transport protocols. FIG. 9C is a diagram showing another embodiment of a data packet for the MPEG-2 protocol. Each data packet comprises a sync byte 950, three transport flags 953, and a packet identifier (PID) 954. The sync byte 950 is used for packet synchronization. The transport flags include a transport error indicator flat (set if errors cannot be corrected in the data stream), a payload unit start indicator (indicting the start of PES data or PSI data, and a transport priority flag). The PID 954 is analogous to the SCID discussed above in that it identifies a data channel. A demultiplexer in the transport chip discussed below extracts elementary streams from the transport stream in part by looking for packets identified by the same PID. As discussed below, time-division multiplexing can be used to decide how often a particular PID appears in the transport stream. The scramble control flag 956 indicates how the payload is scrambled, the adaptation field flag 958 indicates the presence of an adaptation field, and the payload flag 960 indicates that the packet includes payload.

Set Top Box

Figure 10:
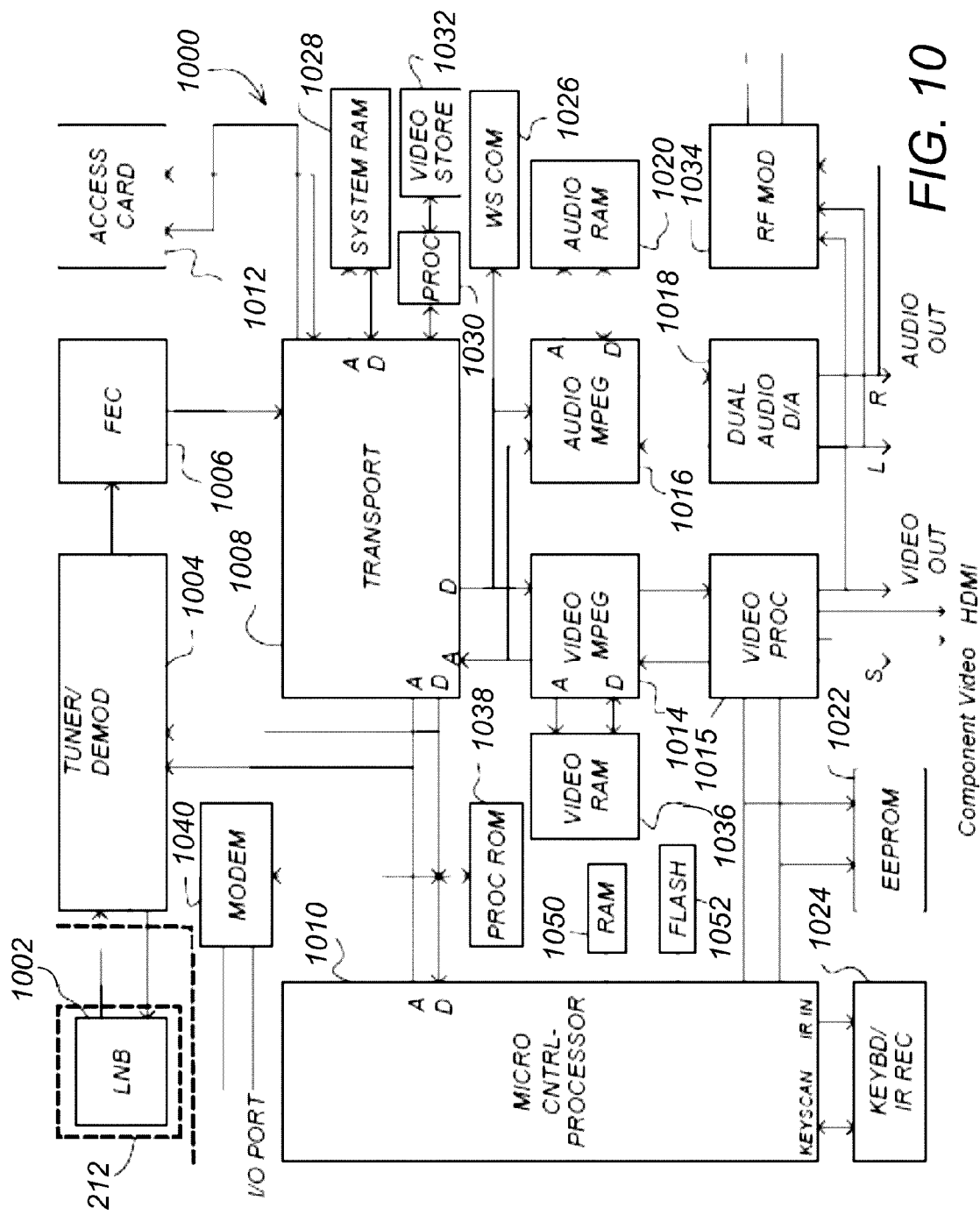
FIG. 10 is a block diagram of a set top box (STB) in accordance with one or more embodiments of the invention.

FIG. 10 is a block diagram of a set top box (STB) 1000 (also hereinafter alternatively referred to as receiver or integrated receiver/decoder, or IRD). The set top box 1000 is part of the receiver station and may comprise a tuner/demodulator 1004 communicatively coupled to an ODU 212 having one or more LNBs 1002. The LNB 1002 converts the 12.2 to 12.7 GHz downlink 218 signal from the satellites 208 to, e.g., a 950-1450 MHz signal required by the set top box's 1000 tuner/demodulator 1004. The LNB 1002 may provide either a dual or a single output. The single-output LNB 1002 has only one RF connector, while the dual output LNB 1002 has two RF output connectors and can be used to feed a second tuner 1004, a second set top box 1000 or some other form of distribution system.

The tuner/demodulator 1004 isolates a single, digitally modulated transponder, and converts the modulated data to a digital data stream. As packets are received, the tuner/demodulator 1004 identifies the type of each packet. If tuner/demodulator 1004 identifies a packet as program guide data, tuner/demodulator 1004 outputs the packet to memory. The digital data stream is then supplied to a forward error correction (FEC) decoder 1006. This allows the set top box 1000 to reassemble the data transmitted by the uplink center 204 (which applied the forward error correction to the desired signal before transmission to the subscriber receiving station 210) verifying that the correct data signal was received and correcting errors, if any. The error-corrected data may be fed from the FEC decoder module 1006 to the transport module 1008 via an 8-bit parallel interface.

The transport module 1008 performs many of the data processing functions performed by the set top box 1000 (e.g., using system random access memory 1028). The transport module 1008 processes data received from the FEC decoder module 1006 and provides the processed data to the video MPEG decoder 1014, the audio MPEG decoder 1016, and the microcontroller 1010 and/or data storage processor 1030 for further data manipulation. In one embodiment of the present invention, the transport module 1008, video MPEG decoder 1014 and audio MPEG decoder 1016 are all implemented on integrated circuits. This design promotes both space and power efficiency, and increases the security of the functions performed within the transport module 1008. The transport module 1008 also provides a passage for communications between the microprocessor 1010 and the video and audio MPEG decoders 1014, 1016. As set forth more fully hereinafter, the transport module 1008 also works with the conditional access module (CAM) 1012 to determine whether the subscriber receiving station 210 is permitted to access certain program material. Data from the transport module 1008 can also be supplied to external communication module 1026.

The CAM 1012 functions in association with other elements to decode an encrypted signal from the transport module 1008. The CAM 1012 may also be used for tracking and billing these services. In one embodiment of the present invention, the CAM 1012 is a smart card, having contacts cooperatively interacting with contacts in the set top box 1000 to pass information. In order to implement the processing performed in the CAM 1012, the set top box 1000, and specifically the transport module 1008 provides a clock signal to the CAM 1012.

Video data is processed by the MPEG video decoder 1014. Using the video random access memory (RAM) 1036, the MPEG video decoder 1014 decodes the compressed video data and sends it to an encoder or video processor 1015, which converts the digital video information received from the video MPEG module 1014 into an output signal usable by a display or other output device. By way of example, processor 1015 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if high definition programming is processed. Such outputs may include, for example, component video and the high definition multimedia interface (HDMI).

Using the audio RAM 1020, audio data is likewise decoded by the MPEG audio decoder 1016. The decoded audio data may then be sent to a digital to analog (D/A) converter 1018. In one embodiment of the present invention, the D/A converter 1018 is a dual D/A converter, one for the right and left channels. If desired, additional channels can be added for use in surround sound processing or secondary audio programs (SAPs). In one embodiment of the invention, the dual D/A converter 1018 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 1010 receives and processes command signals from the remote control 1024, a set top box 1000 keyboard interface, modem 1040, and transport 1008. The microcontroller 1010 receives commands for performing its operations from a processor programming memory, which permanently stores such instructions for performing such commands. The memory used to store data for microprocessor 1010 and/or transport 1008 operations may comprise a read only memory (ROM) 1038, an electrically erasable programmable read only memory (EEPROM) 1022, a flash memory 1052 and/or a random access memory 1050, and/or similar memory devices. The microprocessor 1010 also controls the other digital devices of the set top box 1000 via address and data lines (denoted "A" and "D" respectively, in FIG. 10).

The modem 1040 connects to the customer's phone line via the PSTN port 220. The modem calls, e.g. the program provider, and transmits the customer's purchase information for billing purposes, and/or other information. The modem 1040 is controlled by the microprocessor 1010. The modem 1040 can output data to other I/O port types including standard parallel and serial computer I/O ports. Data can also be obtained from a cable or digital subscriber line (DSL) modem, or any other suitable source.

The set top box 1000 may also comprise a local storage unit such as the storage device 1032 for storing video and/or audio and/or other data obtained from the transport module 1008. Video storage device 1032 can be a hard disk drive, a read/writeable compact disc of DVD, a solid state RAM, or any other storage medium. In one embodiment of the present invention, the video storage device 1032 is a hard disk drive with specialized parallel read/write capability so that data may be read from the video storage device 1032 and written to the device 1032 at the same time. To accomplish this feat, additional buffer memory accessible by the video storage 1032 or its controller may be used. Optionally, a video storage processor 1030 can be used to manage the storage and retrieval of the video, audio, and/or other data from the storage device 1032. The video storage processor 1030 may also comprise memory for buffering data passing into and out of the video storage device 1032. Alternatively or in combination with the foregoing, a plurality of video storage devices 1032 can be used. Also alternatively or in combination with the foregoing, the microprocessor 1010 can also perform the operations required to store and or retrieve video and other data in the video storage device 1032.

The video processing module 1015 output can be directly supplied as a video output to a viewing device such as a video or computer monitor. In addition the video and/or audio outputs can be supplied to an RF modulator 1034 to produce an RF output and/or 8 vestigial side band (VSB) suitable as an input signal to a conventional television tuner. This allows the set top box 1000 to operate with televisions without a video input.

Each of the satellites 208 comprises one or more transponders, each of which accepts program information from the uplink center 204, and relays this information to the subscriber receiving station 210. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCIDs.

Preferably, the set top box 1000 also receives and stores a program guide in a memory available to the microprocessor 1010. Typically, the program guide is received in one or more data packets in the data stream from the satellite 208. The program guide can be accessed and searched by the execution of suitable operation steps implemented by the microcontroller 1010 and stored in the processor ROM 1038. The program guide may include data to map viewer channel numbers to satellite networks, satellite transponders and SCIDs, and also provide TV program listing information to the subscriber 222 identifying program events.

Initially, as data enters the set top box 1000, the tuner/demodulator 1004 looks for a boot object. Boot objects are always transmitted with the same SCID number, so tuner 1004 knows that it must look for packets marked with that identification number. A boot object identifies the identification numbers where all other objects can be found.

As data is received and stored in the memory, the microprocessor 1010 acts as a control device and performs various operations on the data in preparation for processing the received data. These operations include packet assembly, object assembly and object processing.

The first operation performed on data objects stored in the memory 1050 is packet assembly. During the packet assembly operation, microprocessor 1010 examines the stored data and determines the locations of the packet boundaries.

The next step performed by microprocessor 1010 is object assembly. During the object assembly step, microprocessor 1010 combines packets to create object frames, and then combines the object frames to create objects. Microprocessor 1010 examines the checksum transmitted within each object frame, and verifies whether the frame data was accurately received. If the object frame was not accurately received, it is discarded from memory 1050. Also during the object assembly step, the microprocessor 1010 discards assembled objects that are of an object type that the microprocessor 1010 does not recognize. The set top box 1000 maintains a list of known object types in memory 1050. The microprocessor 1010 examines the object header of each received object to determine the object type, and the microprocessor 1010 compares the object type of each received object to the list of known object types stored in memory 1050. If the object type of an object is not found in the list of known object types, the object is discarded from memory 1050. Similarly, the set top box 1000 maintains a list of known descriptor types in memory 1050, and discards any received descriptors that are of a type not in the list of known descriptor types.

The last step performed by microprocessor 1010 on received object data is object processing. During object processing, the objects stored in the memory 1050 are combined to create a digital image. Instructions within the objects direct microprocessor 1010 to incorporate other objects or create accessible user-links. Some or all of the digital images can be later converted to an analog signal that is sent by the set top box 1000 to a television or other display device for display to a user.

The functionality implemented in the set top box 1000 depicted in FIG. 10 can be implemented by one or more hardware modules, one or more software modules defining instructions performed by a processor, or a combination of both.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for processing media content streams comprising:
    (a) a primary multiplexer and a backup multiplexer that are each configured to:
        (i) receive multiple video streams from one or more video sources; and
        (ii) multiplex the multiple video streams to output one or more internet protocol (IP) multicast streams with unique unicast addresses, each IP multicast stream corresponding to a unique multicast address, wherein a subnet portion of the unique multicast address for each video stream is shared between the primary multiplexer and the backup multiplexer;
    (b) a primary uniform transport processing system (UTPS) and a backup UTPS, wherein:
        (i) the primary UTPS and the backup UTPS each join the one or more IP multicast streams output from either the primary multiplexer or the backup multiplexer;
        (ii) multiple virtual local area networks (VLANs) separate the joins of the primary UTPS from the joins of the backup UTPS; and
        (iii) the primary UTPS and the backup UTPS each output each of the one or more IP multicast streams using a unique multicast group; and
    (c) one or more primary modulators and one or more backup modulators, wherein each of the one or more primary modulators and one or more backup modulators:
        (i) join one of the one or more IP multicast streams output from the primary UTPS or backup UTPS; and
        (ii) convert the joined IP multicast stream to radio frequency for uplink to a broadcast distribution network.

2. The system of claim 1, wherein the primary UTPS and the backup UTPS support up to six (6) transponders.

3. The system of claim 1, wherein the primary UTPS and the backup UTPS each provide noise-to-power ratio (NPR) functionality comprising inserting data services into the one or more IP multicast streams.

4. The system of claim 1, wherein the primary UTPS and the backup UTPS each provide transport encryption comprising encrypting the one or more IP multicast streams.

5. The system of claim 1, wherein an input and the output of the primary UTPS and the backup UTPS utilize a motion pictures expert group/internet protocol (MPEG/IP) interface via a customized peripheral component interconnect express (PCIe) card.

6. The system of claim 1, further comprising:
    a primary router configured as:
        a first active hot standby router protocol (HSRP) device for one of the multiple VLANs that serves as a primary VLAN for the primary UTPS; and
        a first standby HSRP device for one of the multiple VLANs that serves as a backup VLAN for the backup UTPS.

7. The system of claim 6, wherein the primary router is further configured as:
    a first protocol independent multicast (PIM) primary router using priority for the primary VLAN; and
    a first PIM standby router using priority for the backup VLAN.

8. The system of claim 6, further comprising:
    a backup router configured as:
        a second standby HSRP device for the primary VLAN; and
        a second active HSRP device for the backup VLAN.

9. The system of claim 8, wherein the backup router is further configured as:
    a second protocol independent multicast (PIM) primary router using priority for the backup VLAN; and
    a second PIM standby router using priority for the primary VLAN.

10. A computer-implemented method for processing media content streams, comprising:
    receiving, in a primary multiplexer and a backup multiplexer, multiple video streams from one or more video sources; and
    multiplexing the multiple video streams to output one or more internet protocol (IP) multicast streams with unique unicast addresses, each IP multicast stream corresponding to a unique multicast address, wherein a subnet portion of the unique multicast address for each video stream is shared between the primary multiplexer and the backup multiplexer;

a primary uniform transport processing system (UTPS) and a backup UTPS each joining the one or more IP multicast streams output from either the primary multiplexer or the backup multiplexer;

separating, using multiple virtual local area networks (VLANs), the joins of the primary UTPS from the joins of the backup UTPS;

the primary UTPS and the backup UTPS each outputting each of the one or more IP multicast streams using a unique multicast group;

one or more primary modulators and one or more backup modulators each joining one of the one or more IP multicast streams output from the primary UTPS or backup UTPS; and converting the joined IP multicast stream to radio frequency for uplink to a broadcast distribution network.

11. The computer-implemented method of claim 10, wherein the primary UTPS and the backup UTPS support up to six (6) transponders.

12. The computer-implemented method of claim 10, further comprising the primary UTPS and the backup UTPS each providing noise-to-power ratio (NPR) functionality comprising inserting data services into the one or more IP multicast streams.

13. The computer-implemented method of claim 10, further comprising the primary UTPS and the backup UTPS each providing transport encryption comprising encrypting the one or more IP multicast streams.

14. The computer-implemented method of claim 10, wherein an input and the output of the primary UTPS and the backup UTPS utilize a motion pictures expert group/internet protocol (MPEG/IP) interface via a customized peripheral component interconnect express (PCIe) card.

15. The computer-implemented method of claim 10, further comprising:
configuring a primary router as:
a first active hot standby router protocol (HSRP) device for one of the multiple VLANs that serves as a primary VLAN for the primary UTPS; and
a first standby HSRP device for one of the multiple VLANs that serves as a backup VLAN for the backup UTPS.

16. The computer-implemented method of claim 15, further comprising configuring the primary router as:
a first protocol independent multicast (PIM) primary router using priority for the primary VLAN; and
a first PIM standby router using priority for the backup VLAN.

17. The computer-implemented method of claim 15, further comprising:
configuring a backup router as:
a second standby HSRP device for the primary VLAN; and
a second active HSRP device for the backup VLAN.

18. The computer-implemented method of claim 17, further comprising configuring the backup router as:
a second protocol independent multicast (PIM) primary router using priority for the backup VLAN; and
a second PIM standby router using priority for the primary VLAN.

* * * * *